(12) United States Patent
Li

(10) Patent No.: US 7,313,651 B2
(45) Date of Patent: Dec. 25, 2007

(54) METHOD AND RELATED APPARATUS FOR DATA MIGRATION OF DISK ARRAY

(75) Inventor: Yong Li, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 293 days.

(21) Appl. No.: 11/160,849

(22) Filed: Jul. 12, 2005

(65) Prior Publication Data

US 2006/0031638 A1   Feb. 9, 2006

(30) Foreign Application Priority Data

Aug. 5, 2004   (TW) .............................. 93123519 A

(51) Int. Cl.
  *G06F 12/00*   (2006.01)
(52) U.S. Cl. ................. 711/114; 711/100; 711/112; 711/161; 711/162; 711/165; 714/6
(58) Field of Classification Search ................. None
  See application file for complete search history.

(56) References Cited

U.S. PATENT DOCUMENTS 7,206,991 B2 *   4/2007   Chatterjee et al. .......... 714/770
2005/0144512 A1 *   6/2005   Ming ............................ 714/6

OTHER PUBLICATIONS

Yu Sheng-Sheng et al., "Research of Small-write Problem in Volume Manage Module for NAS.", Mini-Micro Systems., Dec. 2003, pp. 2338-2341, vol. 24. No. 12.

* cited by examiner

*Primary Examiner*—Jasmine Song
(74) *Attorney, Agent, or Firm*—Winston Hsu

(57) ABSTRACT

While performing data transfer for reading data from a source disk or disks and writing the read data to disks of a disk array, data reading is repeated until accumulated read data can be split into several sub-data with a data size of each sub-data not smaller than a write maximum. Then, these sub-data are written into the disks of the disk array. In this way, the invention can take full advantage of each writing control to write as much data as possible, and the number of writing controls can be reduced to reduce the demands on the computer system.

6 Claims, 5 Drawing Sheets

METHOD AND RELATED APPARATUS FOR DATA MIGRATION OF DISK ARRAY

BACKGROUND OF INVENTION

1. Field of the Invention

The present invention relates to a method and related apparatus for data migration of a disk array, and more particularly, to a method and related apparatus capable of reducing a number of writing controls to improve the efficiency of data migration/transfer of a disk array.

2. Description of the Prior Art

A computer system allows a user to manage, process and access a large quantity of information, data and media, and thereby is an important element of modern society. The information industry develops improvements to computer systems, such that the systems are capable of accessing more data at higher speed and with higher precision.

With the falling costs and increasing capacities of hard disks, many computer systems include a disk array by using different data configurations. For instance, a redundant array of inexpensive disks (RAID) system has different data configurations, such as RAID 0 to RAID 5. For the data configurations RAID 0 and RAID 2 to RAID 5, when performing a writing control to write data into the disk array, the data is striped into a plurality of sub-data (i.e. data stripes) in a stripe manner, and then each sub-data is respectively written to the disks of the disk array. Similarly, while reading data from the disk array, each sub-data is simultaneously read from the different disks of the disk array and combined to obtain the original data again. Whether reading or writing data, disks of the disk array are parallel-working at the same time and thereby provide a higher efficiency of data access.

However, the cost of disk arrays is pretty high; therefore, most computer systems only have one hard disk when leaving the factory. If the user has different requirements, other disks can be added in the computer system so as to improve the efficiency of the disk array. In other situations, there may already have a disk array in the user's computer system. But the user wants to add more disks into the disk array, such that the original small disk array (with a small number of disks) is upgraded to a disk array with a large number of disks. In either situation, if the disk array is upgraded, the user might perform data migration to read data from the original disk array and then re-store data to the upgraded disk array according to the new data configuration.

Please refer to FIG. 1, which is a flowchart of data migration according to the prior art. Suppose that there is only a hard disk A in a computer system. However, the user adds a hard disk B in the computer system to integrate the hard disk A and the hard disk B into a disk array, such as a RAID 0 disk array. Therefore, the user performs data migration to read data from the hard disk A (regarded as a source disk) and then store the read data into disks of the disk array according to the data configuration of the disk array. As known in the art, when the computer system accesses the hard disks, the hard disk controller of the chipset or the disk array controller sends a reading or writing command conforming to advanced technology attachment (ATA) to each disk to perform a reading or writing control. These reading or writing commands will inform the hard disk how many bytes of data are to be accessed and where the data are located in the memory space. Generally, while performing a reading or writing command, the data size of the required read or written data has a maximum. For instance, the maximum data size for a reading command in an ATA specification is 128K bytes, i.e. reading 128K bytes from an assigned region. In the same way, the maximum of data size for a writing command in the ATA specification is also 128K bytes, i.e. writing 128K bytes into an assigned region. In other words, the maximum of a single reading/writing command is 128K bytes. FIG. 1 is a procedure of sending reading or writing commands to each disk when performing data transfer according to the prior art.

As shown in FIG. 1, when performing data transfer, the prior art computer system sends a reading command 102 to disk A, such that 128K-byte data is read from disk A. As mentioned above, the disk array integrated by the hard disk A and B is a disk array allowing parallel access. Therefore, data is stripes into two parts and then respectively stored in the hard disks A and B. According to the command 102, the read data with data size of 128K bytes is striped into two parts with data size of 64K bytes. At the same time, commands 104A and 104B are respectively sent to the hard disks A and B to write or store these two parts into the hard disks A and B.

After completing commands 104A and 104B, the command 106 is sent to the hard disk A to read another 128K-byte data from the hard disk A. Then the two 64K-byte parts are respectively written into the hard disks A and B based on the commands 108A and 108B. The control command sequence "reading 128K, writing 64K-64K, reading 128K, writing 64K-64K" is repeated so that the prior art can sequentially transfer the remaining data to complete data migration.

However, there are some drawbacks in the prior art. As mentioned above, the maximum data size accessible by each reading or writing command is 128K bytes. In the prior art, commands 102 and 106 access 128K-byte data from the hard disk A to instruct the hard disk A to read the maximum of data size in a single control command. However, after getting 128K-bytes of data, according to the configuration of the disk array, the prior art uses two 64K-byte writing commands to respectively write two 64K-byte parts into the hard disks A and B. In fact, the maximum data size for a single writing command is 128K bytes. That is, the prior art cannot make full use of the maximum data size for a single writing command.

Generally, when a file (such as 1024K-byte file) is written into the hard disk, if each writing command could write as much data as possible, the number of writing controls can be reduced to completely write the file into the hard disk. On the contrary, if each writing command writes less data, the number of writing controls is increased to completely write the same file into the hard disk. When the computer system sends commands to the hard disk, it requires a large amount of system resources. As for the data migration shown in FIG. 1, the number of writing controls is large because each writing command writes data less than 128K bytes and thereby requires more of the system's resources. This leads to poor efficiency of data migration.

SUMMARY OF INVENTION

It is therefore a primary objective of the claimed invention to provide a method and related apparatus for improving the efficiency of data transfer/migration to solve the above-mentioned problem. The claimed invention can take full advantage of each writing control to write as much data as possible, and number of writing controls can be reduced to offload the computer system.

When the claimed invention is implemented in data transfer/migration, reading commands are continuously sent to a source disk or disk array until accumulated read data can be striped into a plurality of sub-data with a data size of each sub-data not smaller than a write maximum, and then writing commands are sent to each hard disk. Therefore, the claimed invention can take full advantage of each writing control to write as much data as possible, and number of writing controls/commands can be reduced to improve the efficiency of data migration.

For instance, when a user transfers/migrates data of a hard disk A into RAID 0 disk array integrated by the hard disks A and B, the claimed invention will send two 128K-byte reading commands to the hard disk A to obtain 256K-byte data. Then according to the RAID o configuration, the 256K-byte data is stripes into two sub-data with 128K-byte data size to respectively be written into the hard disks A and B by using two 128K-byte commands. In other words, if 256K bytes of data is transferred from a hard disk to a disk array having two hard disks, the claimed invention only has to sequentially send a 128K-byte reading command, another 128K-byte reading command, and simultaneously two 128K-byte writing commands. The prior art has to sequentially send a 128K-byte reading command, two 64K-byte writing commands, a 128K-byte reading command, and two 64K-byte writing commands, making a total of six commands to completely transfer 256K bytes of data. The claimed invention uses fewer commands than the prior art does and thereby improves the efficiency of data transfer.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
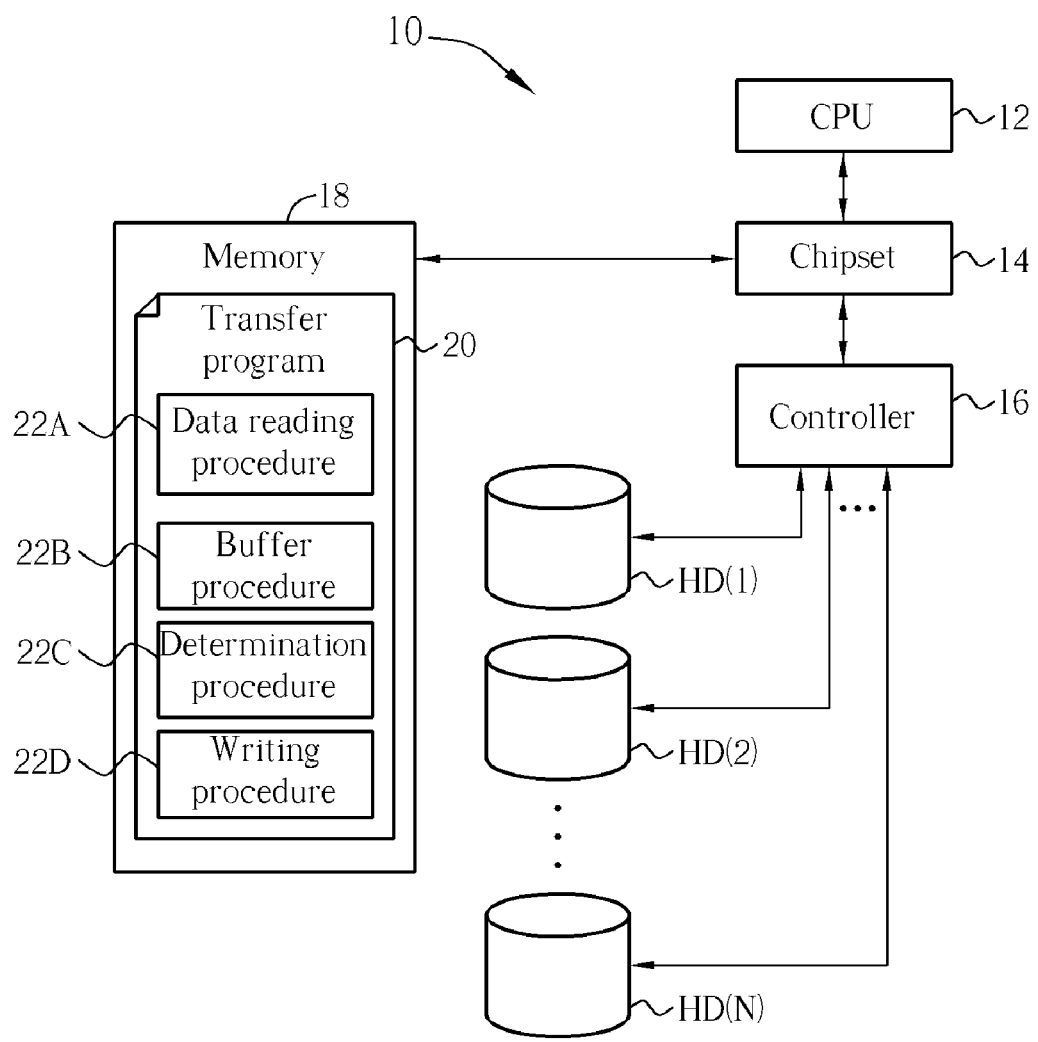
FIG. 2 is a diagram of a computer system according to the present invention.

Please refer to FIG. 2, which is a diagram of a computer system 10 according to the present invention. The computer system 10 comprises a central processing unit (CPU) 12, a chipset 14, a memory 18, a controller 16, and non-volatile storage devices HD (1) to HD (N). The CPU 12 controls the operation of the computer system 10 to process data and execute programs. The memory 18 of the computer system 10 can be a dynamic random access memory (DRAM) to store required information, data or programs when the CPU 12 operates. The chipset 14 is electrically connected to the CPU 12, the memory 18 and the controller 16 to manage data traffic among these components. The storage devices HD (1) to HD (N) can be hard disks. The controller 16 is a hard disk controller or a disk array controller electrically connected to each storage device HD (1) to HD (N) through channels of a bus conforming to advanced technology attachment (ATA), serial ATA, or small computer system interface (SCSI), such that reading or writing commands are sent to each disk to read/write data from/to each storage device. In addition, the controller 16 integrates the storage devices HD (1) to HD (N) into a disk array. The controller 16 can be an intelligent drive electronic (IDE) controller integrated inside the chipset 14, or a disk array controller built on an add-in card and electrically connected to the chipset 14 through a peripheral communication interconnect (PCI) bus.

In the computer system 10, data transfer/migration of the present invention is achieved by software, using a migration program 20. The migration program 20 includes a data reading procedure 22A, a buffer procedure 22B, a determination procedure 22C, and a writing procedure 22D. When the user performs data transfer to read data from a source disk and re-write the read data into disks of the disk array according to the configuration of the disk array, the CPU 12 executes each procedure of the transfer program 20 to achieve data migration of the present invention. When the data reading procedure 22A is executed, the CPU 12 sends a plurality of reading commands to the source disk through the chipset 14 and the controller 16. According to these reading commands, the buffer procedure 22B is executed so that data read from the source disk is buffered, stored (stored in the memory 18), and processed. For instance, the calculation of parity-bit check is performed on the read data and the read data is stripes into a plurality of sub-data based on the configuration of the disk array. The CPU 12 executes the determination procedure 22C to determine whether the data size of each sub-data in a buffer is approximate to a write maximum of a writing command to be written into each disk of the disk array. If approximate to the write maximum, the CPU 12 sends writing commands to each disk of the disk array by executing the writing procedure 22D, respectively writing each sub-data of the buffer into each disk. In this way, the present invention can take full advantage of each writing control to write as much data as possible, and the number of writing controls performed can be reduced to improve the efficiency of data transfer.

Figure 3:
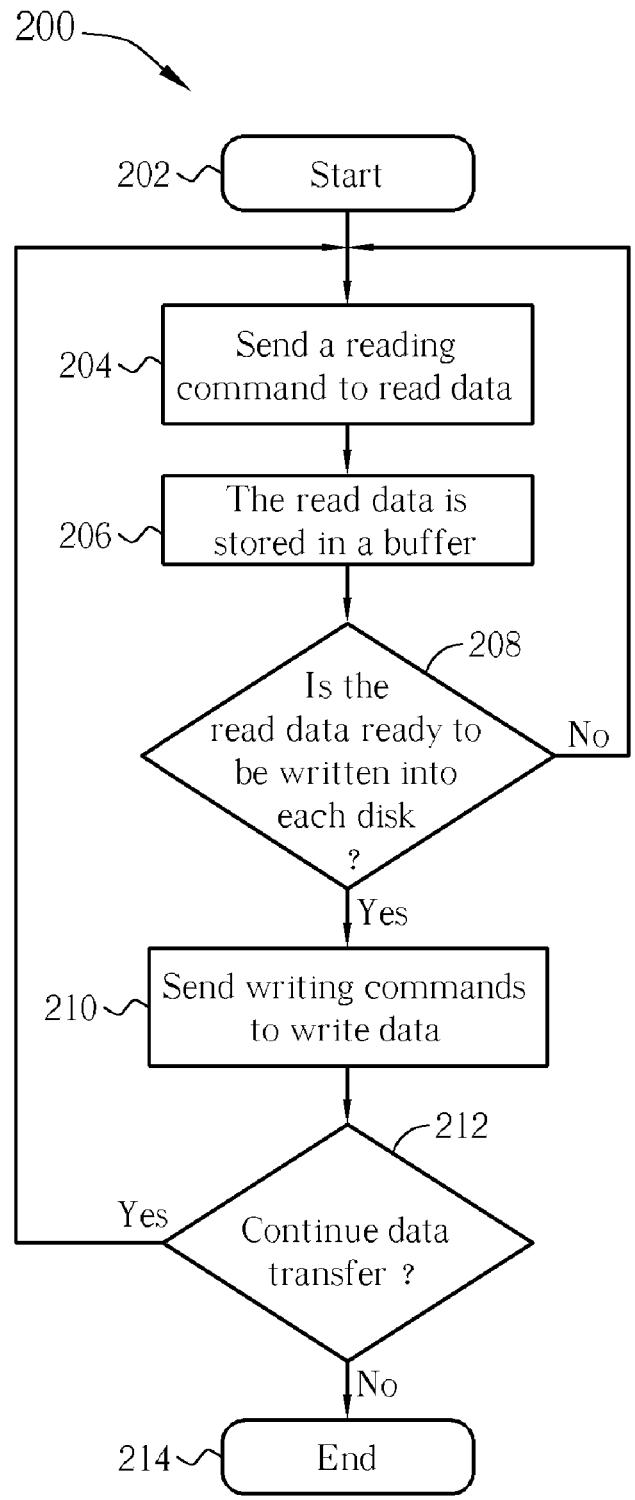
FIG. 3 is a flowchart of when the computer system of FIG. 2 performs data transfer/migration.

Please refer to FIG. 3 and also refer for FIG. 2. FIG. 3 is a flowchart 200 of when the present invention is involved in data transfer/migration. Steps of the flowchart 200 are as follows:

Step 202: Data transfer/migration is started to read data from the source disk and re-write the read data into each disk of the disk array based on the configuration of the disk array. For instance, suppose that the computer system 10 originally has a hard disk HD (1). However, the user wants to add other hard disks HD (2) to HD (N) to establish an RAID 0 disk array integrated by HD (1) to HD (N). After the disk array is integrated, the user will perform data migration to read data originally stored in HD (1) and re-write the read data into disks of the disk array according to the configuration of the RAID 0 disk array. In this case, HD (1) is regarded as the source disk.

Step 204: The CPU 12 sends a reading command to the source disk to read data from the source disk. In the this embodiment of the present invention, every time a reading command is sent to the source disk, the reading command will demand to read as much data as possible from the source disk. As mentioned above, take the ATA specification for example. The maximum data size for a reading command is 128K bytes. Therefore, the present invention reads 128K-byte data from the source disk during each reading command. In addition, if there is a plurality of source disks, the present invention simultaneously sends a reading command to each source disk.

Step 206: The data read from the source disk is temporarily stored in the buffer. If needed, the read data will be appropriately processed. For example, a corresponding parity-bit check is calculated according to the configuration of the disk array so as to generate an array data, which will be stored in the disk array.

Step 208: Determine whether the array data of the buffer in step 206 is ready to be written into each disk of the disk array. If the accumulated read data of the buffer in step 206 is not enough, the striped data size of each sub-data is smaller than the write maximum of a single writing command, which does not take full advantage of a writing command. Therefore, if the data of the buffer in step 206 is not enough, the present invention will repeat step 204 to continue reading data from the source disk and accumulate the read data in the buffer in step 206 until the accumulated read data is enough; that is, the data size of each sub-data conforms to the write maximum, and then the present invention will go to step 210. Otherwise, if the remaining data has been completely read from the source disk in step 204, the present invention will go to step 210.

Step 210: Writing commands are simultaneously sent to each disk of the disk array to write or store each sub-data into each disk. Due to steps 204, 206 and 208, in step 210, the present invention can take full advantage of each writing command to write as much data as possible into each disk.

Step 212: If there is other data to be transferred, go back to step 204. If there is no data left to be migrated, go to step 214.

Step 214: Data migration is over.

Figure 4:
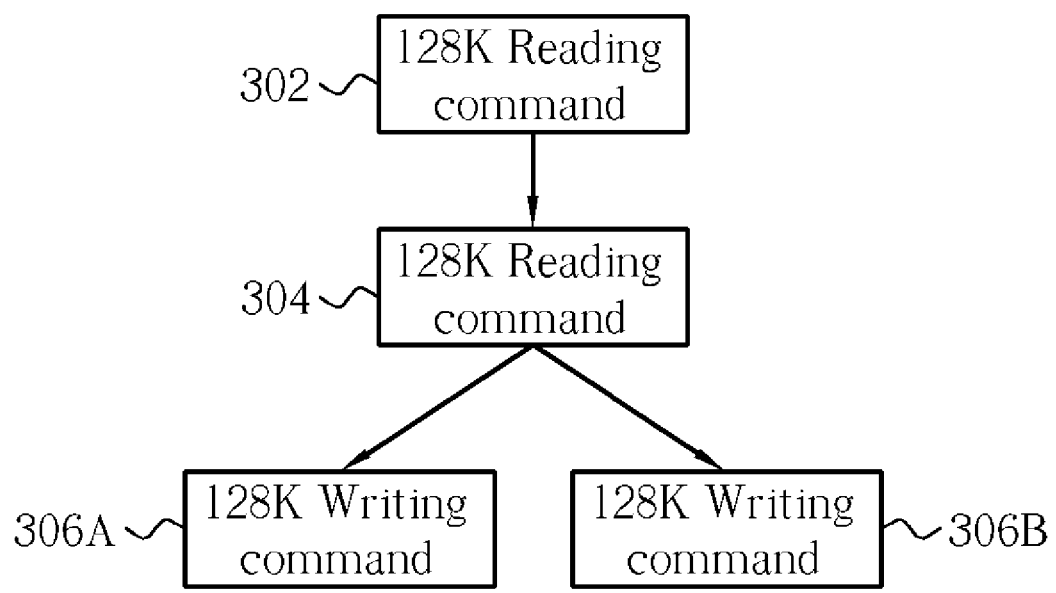
FIG. 4 is a procedure of control commands during data transfer according to the present invention.

In order to shed light on the data transfer/migration of the present invention, please refer to FIG. 4 (also refer to FIG. 3). FIG. 4 is a procedure of control commands sent to each disk when performing 256K-byte data transfer based on the flowchart 200 of the present invention. In FIG. 4, suppose that the computer system 10 includes two hard disks HD (1) and HD (2), and the RAID 0 disk array integrated by HD (1) and HD (2) regards HD (1) as a source disk to transfer data from HD (1) to the RAID 0 disk array. When data transfer is started, the present invention sends a command 302 to the source disk to read 128K-byte data (step 204 of the flowchart 200) and temporarily stores the read data in the buffer (step 206). The read data has 128K bytes and is striped into two 64K-byte parts, not equal to the write maximum (128K bytes) of a writing command. Thus, the present invention goes back to step 204 of the flowchart 200 and sends another command 304 to read 128K-byte data from the source disk to accumulate the read data with 256K-byte data size (step 206). In step 208, the 256K-byte data is striped into two 128K-byte sub-data conforming to the write maximum of a writing command. Subsequently in step 210, the commands 306A and 306B are simultaneously sent to the two hard disks of the disk array to write each 128K-byte data into each disk.

Figure 1:
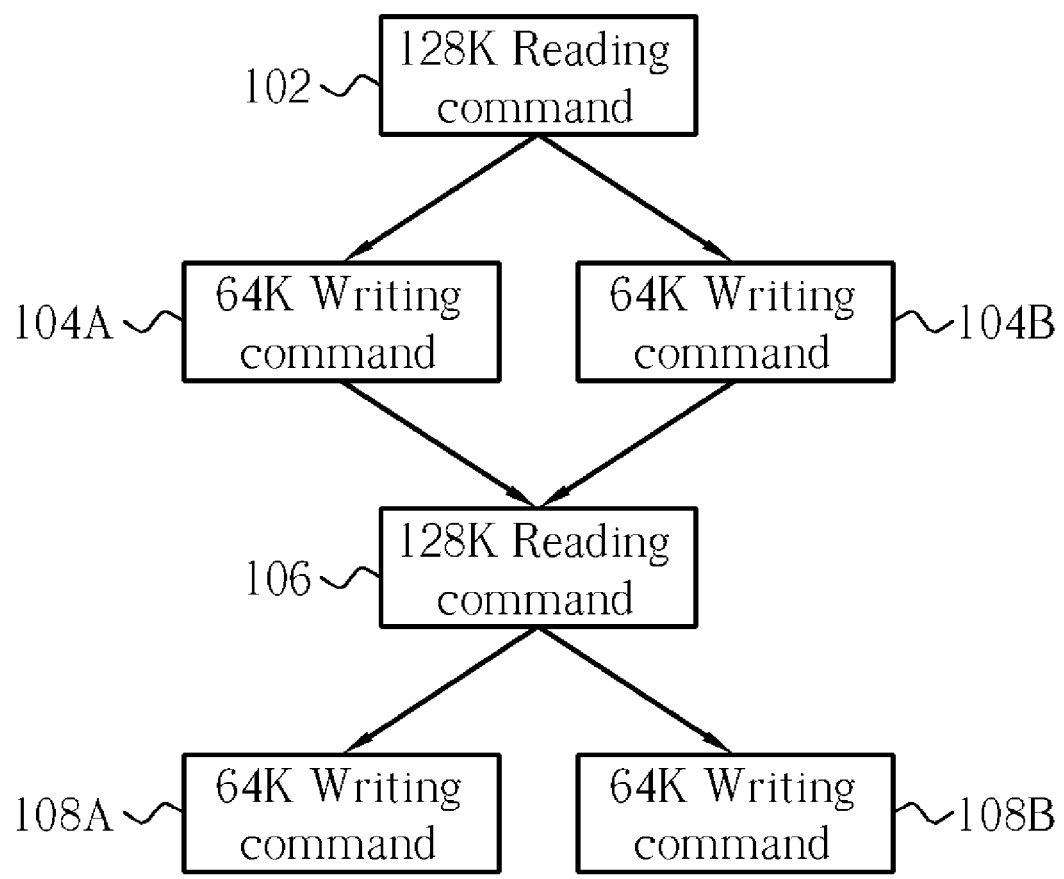
FIG. 1 is a procedure of control commands during data transfer according to the prior art.

Compared to the prior art in FIG. 1, the present invention in FIG. 4 sends four reading/writing commands three times to transfer 256K-byte data from the source disk to the two hard disks of the disk array. However, in the same case, the prior art has to send six reading/writing commands four times. Therefore, the present invention can efficiently decrease the number of reading/writing commands during data transfer/migration, and reduce the negative effect on the performance of the computer system 10 when transmitting and executing reading/writing commands, such that the efficiency of data transfer/migration is improved.

Figure 5:
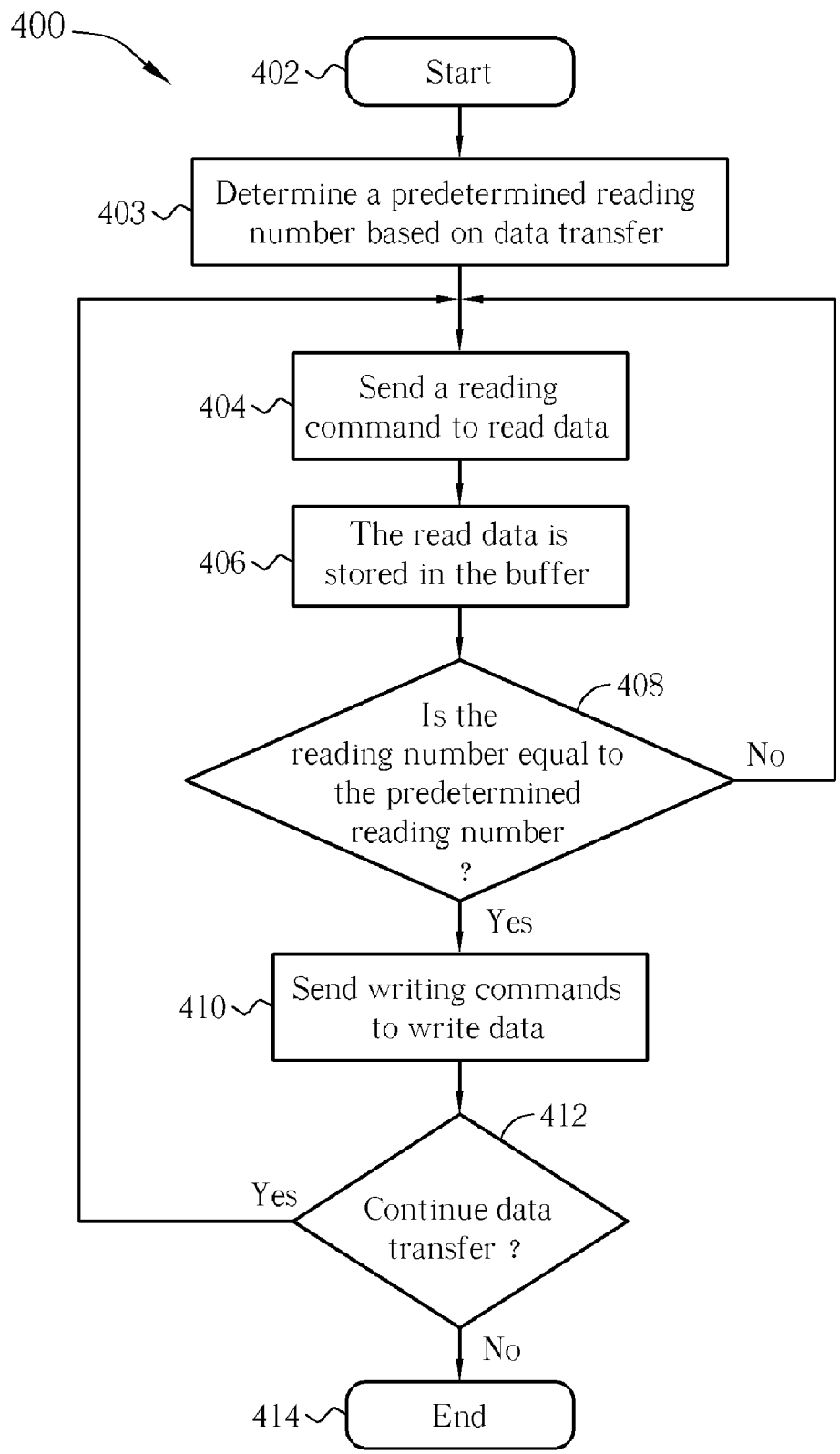
FIG. 5 is another flowchart of when the computer system of FIG. 2 performs data transfer/migration.

When performing data transfer/migration, due to the data transfer scope, the number of source disks and the number of hard disks of the disk array are already known. Thus the present invention can calculate the number of reading commands sent to the source disk to obtain enough data, and then send commands to perform data transfer. Regarding this case, please refer to FIG. 5 (also refer to FIG. 2). FIG. 5 is another flowchart 400 of when the computer system 10 performs data transfer. Steps of the flowchart 400 are as follows:

Step 402: Data transfer/migration is started.

Step 403: A predetermined reading number is calculated based on the data transfer scope. That is, the predetermined number of reading commands is sent to the source disk to accumulate enough data, such that the present invention can take full advantage of the write maximum. For instance, if data is transferred from a source disk to a RAID 0 disk array having N hard disks, the predetermined reading number could be N. The accumulated read data of N reading commands has N×128K bytes and the read data can be split/striped into N sub-data with 128K-byte data size. Then 128K-byte writing commands conforming to the write maximum of a writing command are used to write data into N disks of the disk array.

Step 404: Step 404 is similar to step 204 of the flowchart 200. Writing commands are simultaneously sent to each source disk.

Step 406: Step 406 is similar to step 206. The read data of step 404 is temporarily stored in the buffer.

Step 408: Determine whether the accumulated number of transmitting reading commands in step 404 is equal to the predetermined reading number calculated in step 403. If these are not equal, go back to step 404 and repeat steps 404 and 406 until the accumulated number is equal to the predetermined reading number or until the remaining data is already read, and then go to step 410.

Step 410: Step 410 is similar to step 210 of FIG. 3. The read data is written into each disk of the disk array. After steps 404, 406, and 408, the data size of each sub-data of the buffer should conform to the write maximum for a single writing command and thereby make full use of each writing command to write as much data as possible.

Step 412: If there is other data to be transferred, go back to step 404. If there is no data left to be transferred, go to step 414.

Step 414: Data transfer/migration is over.

As mentioned above, the flowchart 400 is equivalent to the flowchart 200, reading data from the source disk until the split data conforms to the write maximum and then writing the split data into the disk array. For instance, suppose that data is transferred from a source disk to a disk array having two hard disks. In step 403, the present invention calculates that it requires two 128K-byte reading commands sent to the source disk to obtain enough data (256K bytes), such that two 128K-byte writing commands are used to respectively write the sub-data into the disk array. After the predetermined reading number is calculated, two 128K-byte reading commands are used to read 256K-byte data and two 128K-byte writing commands are simultaneously sent to write the split data into each disk, as the procedure of FIG. 4. In FIG. 2, the calculation of the predetermined reading number can be achieved in the determination procedure 22C. The determination procedure 22C is executed to calculate the predetermined reading number of step 403 and step 408 is performed according to the predetermined reading number.

Besides the computer system 10 in FIG. 2, the present invention can also be implemented in other computer system configurations. For example, some computer systems have several disk or disk array controllers, including IDE controllers embedded in the chipset and disk array controllers built on an add-in card and connected to the chipset. The present invention can be implemented in such computer systems. For instance, a computer system uses an IDE controller to control a RAID 0 disk array integrated by two hard disks A and B and a disk array controller built on an add-in card to control another RAID 0 disk array integrated by four hard disks C, D, E, and F. When the computer system utilizes the present invention to transfer/migrate data from the disk array having disks A and B to the disk array having disks C to F, the present invention simultaneously sends 128K-byte reading commands to the source disks A and B two times, through the IDE controller, to accumulate data with data size of 4×128K bytes. In other words, 128K-byte reading commands are respectively sent to the hard disks A and B each time. Next, the present invention uses the disk array controller built on the add-in card to simultaneously send 128K-byte writing commands to the hard disks C to F and thereby take full advantage of each writing command to write as much data as possible into the hard disks C to F at a time. In addition, the present invention can also transfer data from a flash memory to a disk array.

Compared to the prior art, the present invention can take full advantage of each writing command and thereby reduces a number of writing controls sent to disks during data transfer and improves the efficiency of data transfer/migration. For instance, the present invention in FIG. 4 sends four reading/writing commands three times to transfer 256K-byte data from a source disk to the disk array having two hard disks. However, the prior art has to send six reading/writing commands four times, as shown in FIG. 1, to achieve the same data transfer/migration. Therefore, the present invention saves about ¼ the time (=1-¾) of the prior art, and provides a better performance of data transfer/migration to improve the operation efficiency of the computer system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for data transfer among a plurality of storage devices, the method comprising:
   reading data from one or more source storage devices;
   generating array data according to the data;
   splitting the array data into a plurality of N sub-data, where N is an integer greater than 1;
   determining whether the data size of each sub-data is smaller than a write maximum; if not smaller, writing one sub-data in each of N target storage devices respectively; if smaller, continuing reading other data from the one or more source storage devices, and combining each data read to update the array data accordingly until each data size of each sub-data split from the array data is not smaller than the write maximum, and then writing one sub-data to each of the N target storage devices respectively; and
   repeating the above steps until all of the data residing on the one or more source storage devices is transferred to the N target storage devices, wherein only the N target storage devices are used for storing the data from the one or more source storage devices.

2. The method of claim 1, wherein while reading data from a source storage device, the data read from the source storage device has a constant data size.

3. The method of claim 2 wherein the write maximum is equal to the data size of data read from a source storage device at one time.

4. A computer system comprising:
   a plurality of storage devices comprising one or more source storage devices and N target storage devices, where N is an integer greater than 1;
   a central processing unit (CPU) for executing programs to control the operation of the computer system; and
   a memory for storing a transfer program, the transfer program including:
      a data reading procedure for controlling the computer system to read data from the one or more source storage devices when the CPU executes the data reading procedure;
      a buffer procedure for controlling the computer system to generate an array data according to the read data during the data reading procedure and split the array data into a plurality of N sub-data when the CPU executes the data reading procedure; and
      a determination procedure, wherein when the CPU executes the determination procedure, the CPU determines whether a data size of each sub-data is smaller than a write maximum; if not smaller, one sub-data is written in each of the N target storage devices; if smaller, the CPU continues performing the data reading procedure to read other data and combines each data from each data read in the buffer procedure to update the array data accordingly until each data size of each sub-data split from the array data is not smaller than the write maximum, and then one sub-data is written in each of the N target storage devices respectively,
   wherein the transfer program continuously reads data from the one or more source storage devices and writes the data to the N target storage devices until all of the data residing on the one or more source storage devices is transferred to the N target storage devices, wherein only the N target storage devices are used for storing the data from the one or more source storage devices.

5. The computer system of claim 4 wherein data with a constant data size is read from a source storage device when the CPU executes the data reading procedure.

6. The computer system of claim 5 wherein the write maximum is equal to the data size of data read from a source storage device when the data reading procedure is executed.

* * * * *